US011619761B2

(12) United States Patent
Dixon et al.

(10) Patent No.: US 11,619,761 B2
(45) Date of Patent: Apr. 4, 2023

(54) DYNAMIC REPRESENTATION OF EXPLORATION AND/OR PRODUCTION ENTITY RELATIONSHIPS

(71) Applicant: Schlumberger Technology Corporation, Sugar Land, TX (US)

(72) Inventors: Todd Christopher Dixon, Houston, TX (US); Andrei Ionescu, Pune (IN); Julian Jose Moreno, Pune (IN)

(73) Assignee: Schlumberger Technology Corporation, Sugar Land, TX (US)

(*) Notice: Subject to any disclaimer, the term of this patent is extended or adjusted under 35 U.S.C. 154(b) by 99 days.

(21) Appl. No.: 16/646,173

(22) PCT Filed: Sep. 12, 2018

(86) PCT No.: PCT/US2018/050734
§ 371 (c)(1),
(2) Date: Mar. 11, 2020

(87) PCT Pub. No.: WO2019/055553
PCT Pub. Date: Mar. 21, 2019

(65) Prior Publication Data
US 2020/0278471 A1    Sep. 3, 2020

Related U.S. Application Data (60) Provisional application No. 62/557,537, filed on Sep. 12, 2017.

(51) Int. Cl.
*G01V 3/36* (2006.01)
*G06F 16/901* (2019.01)

(52) U.S. Cl.
CPC ............ *G01V 3/36* (2013.01); *G06F 16/9024* (2019.01)

(58) Field of Classification Search
CPC .... G06F 16/9024; G06F 16/355; G06F 17/18; G01V 3/36; E21B 44/00
See application file for complete search history.

(56) References Cited

U.S. PATENT DOCUMENTS 8,364,614 B2 * 1/2013 Bhaskar ................. G06N 3/126
706/48
9,280,581 B1 * 3/2016 Grimes ................... G06F 17/18
(Continued)

FOREIGN PATENT DOCUMENTS

CN   106919719   * 7/2017   ......... G06F 16/2219
WO   WO-2006103398 A1 * 10/2006 ............ G06F 16/211

OTHER PUBLICATIONS

International Preliminary Report on Patentability for the counterpart International patent application PCT/US2018/050734 dated Mar. 26, 2020.
(Continued)

*Primary Examiner* — Catherine T. Rastovski
*Assistant Examiner* — Kaleria Knox
(74) *Attorney, Agent, or Firm* — Michael Guthrie (57) ABSTRACT

Methods, apparatus, systems, and computer-readable media are set forth for providing a graphing database for exploration and/or production data, e.g., as used in the oil & gas industry. The graphing database can include multiple different entities that are defined by nodes, node edges, and properties that are generated from information collected by an exploration and/or production system. Entities can be designated as complete when the attribute data associated with those entities satisfy mapping rules for standardizing different types of entities. In this way, end users that access data from the graphing database can receive complete data that is consistently available through a variety of sources.

19 Claims, 8 Drawing Sheets

(56) References Cited

U.S. PATENT DOCUMENTS

| | | | |
|---|---|---|---|
| 2009/0020284 A1* | 1/2009 | Graf | E21B 44/00 |
| | | | 166/250.15 |
| 2010/0161602 A1* | 6/2010 | Caceres | G06F 16/2465 |
| | | | 707/736 |
| 2011/0167089 A1 | 7/2011 | Schoen et al. | |
| 2012/0215777 A1* | 8/2012 | Malik | G06F 16/355 |
| | | | 707/737 |
| 2012/0239797 A1* | 9/2012 | Agrawal | H04L 41/12 |
| | | | 709/224 |
| 2015/0278241 A1* | 10/2015 | Bates-Haus | G06F 16/1748 |
| | | | 707/692 |
| 2017/0038132 A1 | 2/2017 | Guillard et al. | |
| 2017/0075984 A1* | 3/2017 | Deshpande | G06F 16/9535 |

OTHER PUBLICATIONS

International Search Report and Written Opinion for the counterpart International patent application PCT/US2018/050734 dated Jan. 18, 2019.

\* cited by examiner

```
┌─────────────────────────────────────────────────────────────────┐
│   GENERATING FIRST ENTITY DATA AND SECOND ENTITY DATA FROM      │
│ INFORMATION COLLECTED DURING AN OPERATION OF AN EXPLORATION     │
│                   AND PRODUCTION SYSTEM                          │
│                           602                                    │
└─────────────────────────────────────────────────────────────────┘
                                │
                                ▼
┌─────────────────────────────────────────────────────────────────┐
│  DETERMINING A FIRST ENTITY TYPE FOR THE FIRST ENTITY DATA AND A │
│       SECOND ENTITY TYPE FOR THE SECOND ENTITY DATA              │
│                           604                                    │
└─────────────────────────────────────────────────────────────────┘
                                │
                                ▼
┌─────────────────────────────────────────────────────────────────┐
│    IDENTIFYING, BASED ON THE FIRST ENTITY TYPE AND THE SECOND    │
│ ENTITY TYPE, ONE OR MORE RULES ACCESSIBLE TO AN ENTITY MAPPING   │
│ ENGINE FOR DETERMINING WHETHER THE FIRST ENTITY DATA AND THE     │
│         SECOND ENTITY ARE EACH COMPLETE ENTITIES                 │
│                           606                                    │
└─────────────────────────────────────────────────────────────────┘
                                │
                                ▼
┌─────────────────────────────────────────────────────────────────┐
│ COMPARING EACH OF THE FIRST ENTITY DATA AND THE SECOND ENTITY    │
│        DATA TO THE ONE OR MORE IDENTIFIED RULES                  │
│                           608                                    │
└─────────────────────────────────────────────────────────────────┘
                                │
                                ▼
┌─────────────────────────────────────────────────────────────────┐
│ GENERATING DATA THAT INDICATES WHETHER THE FIRST ENTITY DATA     │
│  AND THE SECOND ENTITY DATA CORRESPOND TO COMPLETE ENTITIES      │
│                           610                                    │
└─────────────────────────────────────────────────────────────────┘
```

DYNAMIC REPRESENTATION OF EXPLORATION AND/OR PRODUCTION ENTITY RELATIONSHIPS

CROSS-REFERENCE TO RELATED APPLICATION(S)

This application claims priority to and the benefit of a U.S. provisional application having Ser. No. 62/557,537, filed 12 Sep. 2017, which is incorporated by reference herein.

BACKGROUND

In the oil and gas industry, data is often generated from a variety of sources for clients that seek to remain privy to the latest trends in exploration and production technology. When data is not consistent or inaccessible, decisions made by such clients may not be the most well-informed, potentially resulting in production inefficiencies. Furthermore, enterprises of all types and sizes are coping with a wider variety of data at a very large scale, making it more difficult than ever to realize production insights. At the same time with the growth in cloud based commodity computing, it is becoming increasingly difficult to package insights for delivery to customers and clients.

SUMMARY

Methods, apparatus, systems, and computer-readable media are set forth for providing a graphing database for exploration and/or production data, e.g., as used in the oil & gas industry. In some implementations, a method implemented by one or more processors is set forth includes receiving entity data from one or more devices. The entity data can be associated with one or more systems for exploring and/or producing natural resources. The method can also include comparing the entity data based on one or more mapping rules for determining a similarity between attributes of the entity data. Additionally, the method can include generating a graphing structure for organizing the entity data. The graphing structure can be generated in response to the similarity between attributes satisfying at least one mapping rule of the one or more mapping rules. The graphing structure can include (i) at least one node that identifies a device that is connected to the one or more systems for exploring and/or producing natural resources and (ii) at least one node edge that identifies a property of the device identified by the at least one node.

The at least one mapping rule can be associated with a Levenshtein distance threshold. The graphing structure can include multiple nodes connected by the at least one node edge, and the device can be an oil rig or an oil well. In some implementations, the method can include determining a completeness of the entity data according to the one or more mapping rules. The one or more mapping rules can include a device mapping rule that identifies a set of attributes to be mapped or defined to satisfy the device mapping rule. The method can also include, when the entity data identifies the device and lacks an attribute identified in the set of attributes, assigning a completeness score to the entity data. In some implementations, the method can include, when the entity data identifies the device and includes all attributes identified in the set of attributes, designating the entity data as a complete entity. The graphing structure can include a first node that identifies the device, a second node that identifies a product of the device, and multiple node edges that are each connected between the first node and the second node in different directions. The device can be an oil rig, the product can be a reservoir, and the at least one node edge of the multiple node edges indicates that the oil rig functioned to produce the reservoir.

In other implementations, a system is set forth as including one or more processors, and memory configured to store instructions that, when executed by one or more processors, cause the one or more processors to perform operations that include storing first entity data and second entity data. The first entity data and the second entity data can be associated with one or more exploration and/or production systems. The first entity data can be designated as a complete entity and the second entity data can be designated as an incomplete entity. The operations can also include identifying, by an entity mapping engine, an attribute of the second entity data that is unavailable and providing support for designating the second entity data as incomplete, at least based on one or more rules accessible to the entity mapping engine. Additionally, the operations can include generating data that correlates the attribute of the second entity data to a separate attribute of the first entity data, wherein the separate attribute satisfies the one or more rules. The operations can further include designating the second entity data as complete, at least based on the attribute of the second entity satisfying the one or more rules. The data that correlates the attribute of the second entity data to a separate attribute can include a node edge associated with a graphical database. The node edge can be associated with property data that describes a temporal relationship between the first entity data and the second entity data. The one or more exploration and/or production systems can include an oil rig and an oil well, and the first data entity and the second data entity can include identifiers for the oil rig and the oil well. The operation of designating the second entity data as complete can include modifying a completeness score for the second entity data. The attribute and the separate attribute can be stored on different devices that are accessible to the entity mapping engine.

In yet other implementations, a non-transitory computer readable medium is set forth as storing instructions that, when executed by one or more processors, cause the one or more processors to perform operations that include generating first entity data and second entity data from information collected during an operation of an exploration and/or production system. The operations can also include determining a first entity type for the first entity data and a second entity type for the second entity data. The operations can further include identifying, based on the first entity type and the second entity type, one or more rules accessible to an entity mapping engine for classifying the first entity data and the second entity each as complete entities. Additionally, the operations can include comparing each of the first entity data and the second entity data to the one or more identified rules, and generating data that indicates whether the first entity data and the second entity data correspond to complete entities. The one or more identified rules can include a name matching rule for determining a similarity between entity names. Comparing each of the first entity data and the second entity data to the one or more identified rules can include identifying attributes available from the first entity data and the second entity data. At least one rule of the one or more rules can identify a number of attributes to be available for the first entity type for indicating whether the first entity data corresponds to a complete entity. The first entity data can be stored by a graphing database that includes nodes and node edges that identify different portions of the exploration and/or production system. A node of the first entity data can identify a reservoir, a rig, or a well of the exploration and/or production system.

Some implementations may also include a system including one or more processors and memory configured to store instructions that, when executed by one or more processors, cause the one or more processors to perform any of the aforementioned operations, as well as a non-transitory computer readable medium configured to store instructions that, when executed by one or more processors, cause the one or more processors to perform any of the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION OF THE INVENTION

The described embodiments relate to systems, methods, and apparatus for processing exploration and/or production data to generate digital entities that are interrelated and made available to a variety of clients. Providing data analytics to customers can be a relatively simple task when the end product is leveraging common processing techniques. However, in order to deliver unique and valuable data to customers, a service company must be willing to adapt their processing techniques to employ the latest technology. In order to ensure that the service company can fluidly transition through the changes in technology, the data being processed by the service company can be compiled into standardized digital entities.

Historically, the collection of data has been enhanced in multiple different ways, including the digitalization and the digitization of data. The digitization of data can refer to the conversion of certain information, including images, signals, and sounds, into discrete or binary form. Digitalization can refer to the use of digitized information to induce a technological change within a particular industry, such as telecommunications, medical, manufacturing, among many others. In the exploration and production industries, including the oil and gas industry, digitalization has been the basis for enterprises that are linked to data from a number of different sources, namely measurement, extraction, and storage systems.

In order to ensure that such enterprises are adaptable to changes in technology, the data from one or more sources can be compiled into one or more standardized digital entities. Furthermore, in some implementations, the relationships between the digital entities can be embodied in a data graph or a graph database. Specifically, a graph database can use graph structures with nodes, edges, and/or other properties to represent and store data. Stored data can be directly linked by the graph structures enabling the data to be more readily accessed and processed by a variety of clients.

Figure 1:
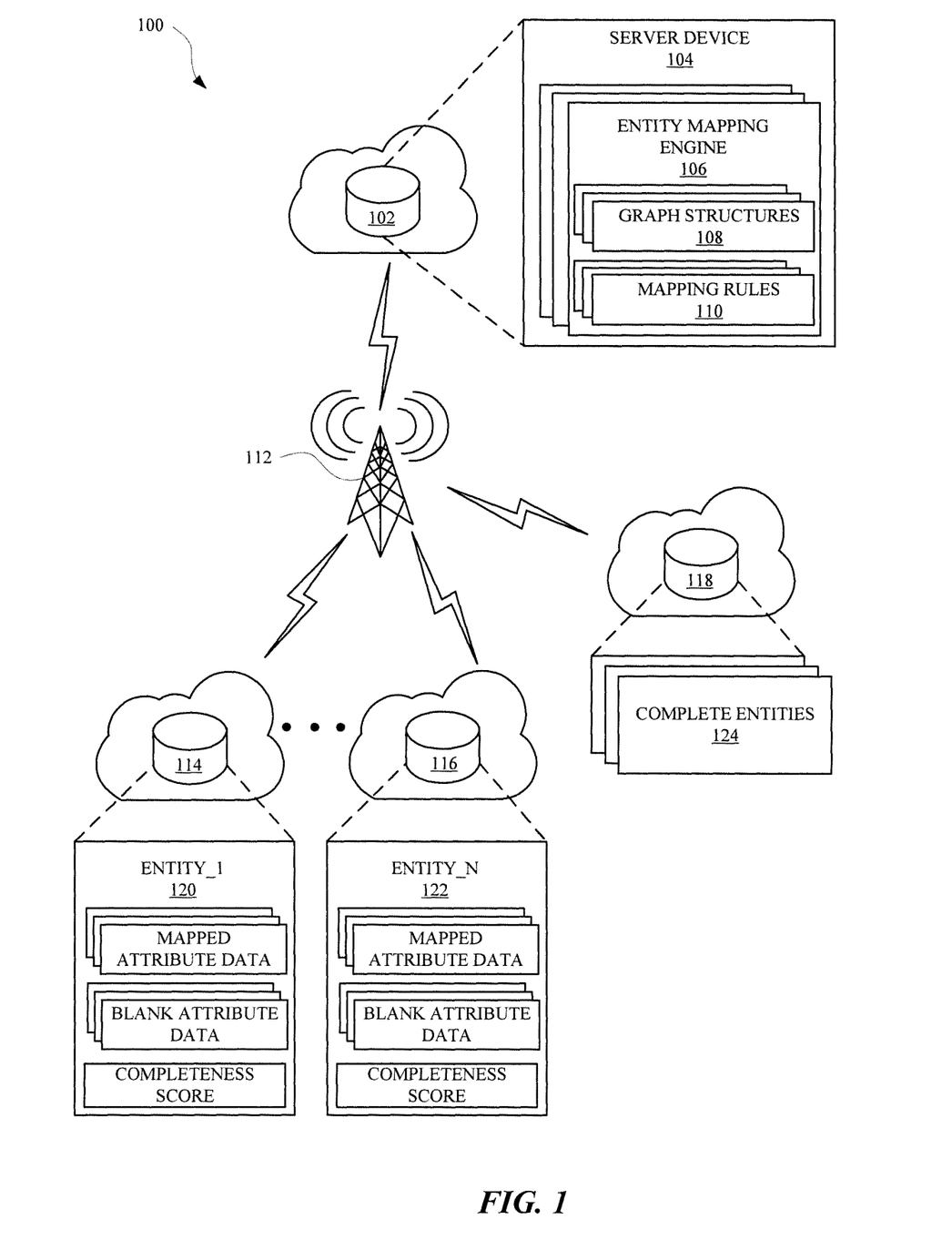
FIG. 1 illustrates a system for providing complete data entities for understanding exploration and production data from a variety of sources.

FIG. 1 illustrates a system 100 for providing complete entities 124 for understanding exploration and/or production data from a variety of sources. The system 100 can include a remote device 102, such as a server device 104, capable of accessing other remote devices for collecting data over a network 112. The server device 104 can include an entity mapping engine 106 for compiling a graph database using graphing structures 108 and mapping rules 110. The entity mapping engine 106 can retrieve entity attributes from multiple different sources in order to compile complete entities 124. For instance, data related to exploration and production assets, such as an oil well, can be associated with multiple different entities (e.g., ENTITY_1 120, ENTITY_N 122) from various sources (e.g., remote device 114, remote device 116). In order to generate a complete entity 124 corresponding to the oil well, the entity mapping engine 106 can retrieve attribute data from each of the sources in order to build a complete entity 124 according to the mapping rules 110. For example, in order to have a complete entity 124 corresponding to the oil well, the mapping rules 110 can require certain attributes for the complete entity 124, such as spud date (i.e., when initially drilled), elevation, reference elevation, drillers total depth, and/or any other data that can be associated with an oil well. In some implementations, the mapping rules 110 can be set by one or more users of the system 100 and/or learned through one or more machine learning algorithms capable of identifying trends in data provided from various sources. When certain attributes are unavailable from a particular entity or for a particular entity, at least based on whether the attributes are required by a mapping rule 110, a notification can be provided from the server device 104, and/or any other device associated with the entity. In response, a graphing structure 108, such as a new node, edge, and/or property can be associated with the entity for fulfilling the attribute requirement for the entity.

Nodes of the graph database, and generated by the entity mapping engine 106, can represent physical structures, businesses, people, accounts, devices, and/or any other object that can be represented as a mapped source of data. For instance, and with respect to exploration and production systems, a node can represent an oil well, production volume of an oil well, one or more data logs associated with one or more wells, an oil field, an oil rig or platform, and/or any other object or information that can be associated with a natural resource. Edges of the graph database generated by the entity mapping engine 106 can connect the nodes of the graph database. The edges can be indicative of properties of the relationship between nodes. For instance, an edge can indicate a direction of a connection between nodes, a type of connection between nodes, and number of connections between nodes. The type of connection between nodes can, for example, describe an origin of a connection, a status of the connection, an authorship of the connection, and/or any other property that can be attributed to a connection between nodes. Properties of the nodes generated by the entity mapping engine 106 can identify the data that is represented by the nodes. For example, with respect to exploration and production, the properties can identify spud date, operators, coordinates, elevation, and/or any other information that can be associated with exploration and production of natural resources. Furthei wore, in some implementations, the properties can also be correlated or otherwise associated with edges that are connecting the nodes. For instance, a property of a node edge or connection between nodes can include an identifier, a time, a location, and/or any other property that can be associated with a connection between nodes. In this way, queries for collecting data associated with edges can be more readily responded to. Such queries can include identifiers that can identify one or more edges between nodes, ranges that can identify a threshold of values in which certain edges can be included, and/or properties that can filter edges according to the properties that they can include or otherwise describe.

In order to ensure that users of the system 100 are receiving quality data, delivery of data in response to queries can be provided from complete entities 124, as established by the entity mapping engine 106. For instance, a mapping rule 110 can define a complete entity 124 for an oil well as including an attribute mapping to well coordinates and well pressure. An entity, such as ENTITY_1 120, can include mapped attribute data (e.g., spud date), but not the well coordinates or well pressure. Such a lack of data in certain entities can be referred to as blank attribute data, which can be mapped in order to convert the entity into a complete entity 124. For instance, a data manager, which can be a manual operator or automated software process (e.g., the entity mapping engine 106), can acknowledge the blank attribute data and identify another entity (e.g., ENTITY_N 122) for mapping the blank attribute data. The ENTITY_N 122 can be, for example, a data log that was generated based on data collected at the oil well corresponding to the ENTITY_1 120. The graphing structure 108 generated by the entity mapping engine 106 for linking the ENTITY_1 120 to ENTITY_N 122 can be an edge with a properties such as, for example, OPERATING_AT and LOCATED_AT. These edges properties can indicate that the oil well is "operating at" a particular well pressure and located at particular well coordinates. When ENTITY_1 120 is sufficiently mapped according to the mapping rules 110, the ENTITY_1 120 can be considered a complete entity 124 and available to queries submitted through the network 112. It should be noted that the complete entities 124 can be stored at one or more storage devices. For instance, the complete entities 124 can include attributes or properties that are mapped to other entities or nodes that are stored on different devices.

In some implementations, the entity mapping engine 106 can assign completeness scores to entities as they are compiled and completed according to the mapping rules 110. A completeness score can depend on a type of node that is being mapped and completed by the entity mapping engine 106. If an oil well entity requires ten properties or attributes to be complete according to the mapping rules 110 and the oil well entity currently has five mapped properties and five blank properties, the entity mapping engine 106 can be assigned a completeness score of 50%. As entities are updated by the entity mapping engine 106, the completeness score can be adjusted to reflect how complete an entity is. In this way, the system 100 can offer entities that are reliable with respect to the amount of data that can be offered by them. In this way, new technology that needs to leverage its operations on the existence quality data can be more readily adapted to the standardized complete entities 124.

In some implementations, when a user accesses or otherwise receives data associated with a complete entity 124 and that complete entity 124 is subsequently updated, the user can be notified of the update. Alternatively, if the user accesses data associated with a complete entity 124 and the accessed data is indicated as incorrect by another source or authority of data, the user can be notified that they had accessed incorrect data. In yet other implementations, a user can initialize the execution or re-execution of a mapping rule 110 on a complete entity 124 or incomplete entity in order to verify that an entity is correlated with the most recent or highest quality data. Such re-executions can be performed by the entity mapping engine 106 at predetermined intervals and, if inconsistencies or changes in data are exhibited, the server device 104 can provide notifications to users that have accessed the entities associated with the inconsistencies and/or the changes. Such changes can occur in properties of the nodes, edges, and/or any other properties of the entities.

In some implementations, users of the system 100 can operate applications and/or other software for creating, updating, editing, and/or removing entities from the system 100, including complete entities 124. In order to make changes to entities, a user can access the server device 104 directly or through a remote device in order to edit mapping rules 110 for the entities. As a user edits the entities and/or the mapping rules 110, different versions of an entity can be created. However, in some implementations, latest version of an entity can be designated as the subject of queries submitted to the system 100, at least based on the assumption that the most recent changes are the most accurate. Should a user prefer a different version be the subject of the queries, permissions for the user can be assigned in order for the user to make changes to this preference.

Entities of the system 100 can be split or otherwise rearranged in order to create or replace entities. For instance, nodes of an entity can be correlated to a separate entity. Furthermore, the separate entity can include blank attribute data which can be mapped from existing entities and/or other sources of data for completing the separate entity according to the mapping rules 110.

Figure 2:
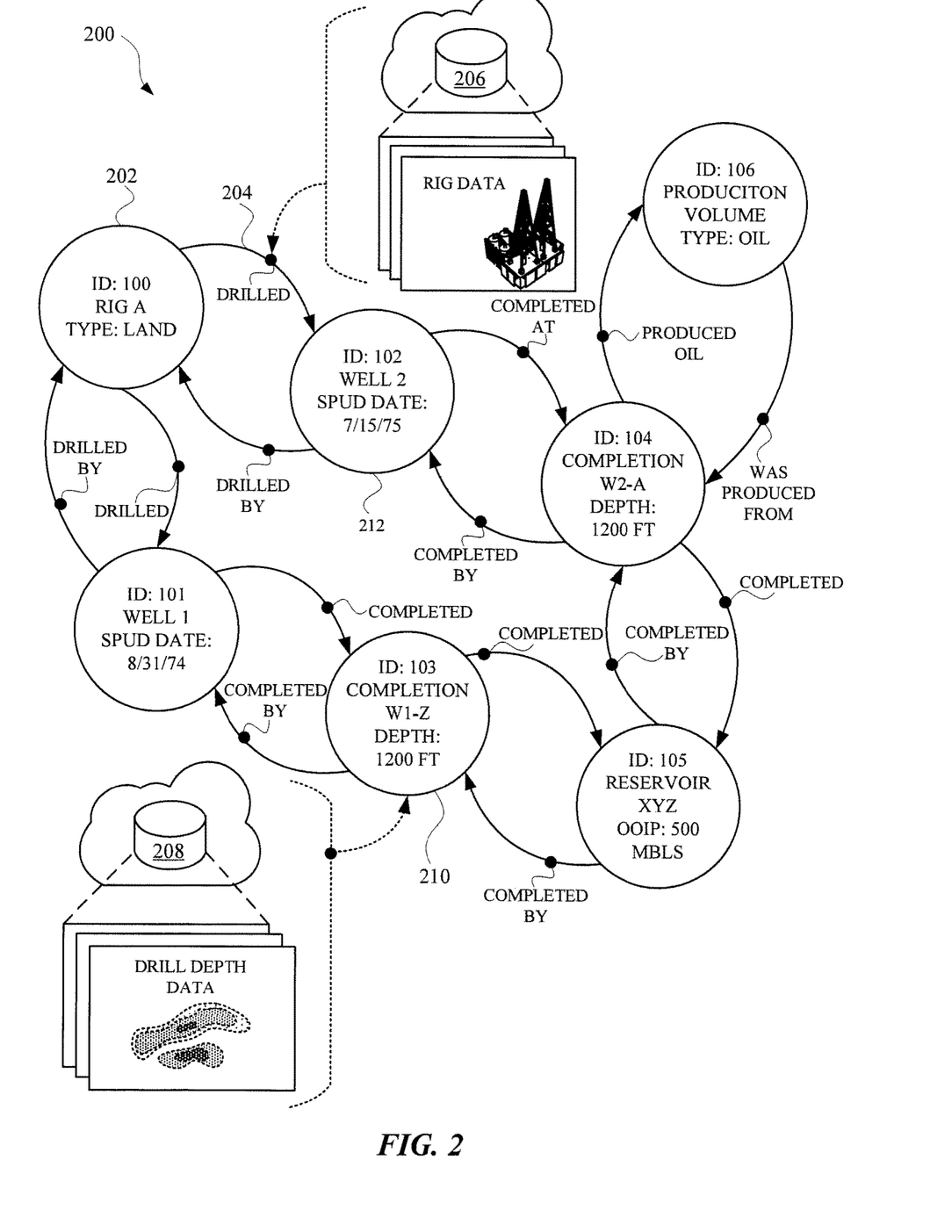
FIG. 2 illustrates an entity generated by an entity mapping engine.

FIG. 2 illustrates an entity 200 generated by an entity mapping engine according to a graphing structure. The entity mapping engine can generate nodes, edges, and/or other properties from various sources for creating the entity 200, which can be stored in a graphical database. The entity 200 can include, for example, multiple different nodes 202 that can be correlated through edges 204, which can define relationships of data identified by the nodes 202. For instance, node 202 having ID: 100 can be associated with a rig (e.g., RIG A), which has a particular type (e.g., land). A separate node 212 can be associated with a well (e.g., WELL 2), which was drilled by "RIG A." This relationship between node 202 and node 212 can be generated by an entity mapping engine using data from a remote device 206, which can store rig data. The relationship can be embodied in an edge 204 that interconnects node 202 and node 212. For instance, the relationship can be embodied as an entry in a graphical database with text such as, for example, "DRILLED" and/or "DRILLED BY," to provide a descriptor for the relationship. Furthermore, the edge 204 can be directional, therefore the entry associated with the edge 204 can be defined according to where the edge 204 is pointing and where the edge 204 originated from.

Data correlated to the various nodes, such as node 210 can be based on information provided by a remote device 208. The node 210 can provide drill depth data, which can be collected by one or more sensors that are directly or indirectly in communication with the remote device 208. For instance, the remote device 208 can be accessed by the entity mapping engine for generating the node 210, which details the apparatus and depth for a particular well (e.g., WELL 1). The entity mapping engine can use the information from remote device 208 to generate other nodes, which can provide the spud date of the WELL 1, and details related to the reservoir provided as a result of the completion of WELL 1. The entity can be considered completed or "well-known," when the data provided in the entity satisfies one or more mapping rules of the entity mapping engine. For instance, a mapping rule can specify that an entity will be considered complete when the entity includes data related a rig type, wells generated by the rig, reservoirs generated from the wells, and a type of resource (e.g., oil) provided from the reservoir. Although a single source of data may not provide all information needed to render an entity complete, the entity mapping engine can regularly query other sources of data in order to compile enough information to render more entities complete. As complete entities are compiled, such completed entities can be made available to consumers seeking to integrate data from the complete entities into their products. Such products can include application programming interfaces (APIs) for controlling and managing exploration and production systems.

In some implementations, mapping rules for generating complete entities and/or a package of complete entities can be manually controlled by a user. Furthermore, the user can define rules for delivery of the entities to particular APIs, in order that service providers can fluidly receive data from a variety of exploration and/or production related sources. Such rules (i.e., work flow rules) that govern the distribution of data to completed entities and to APIs can be embodied as configuration files (e.g., JSON configuration files) for execution by a device that is accessible to the entity mapping engine. Furthermore, the rules can be compiled through an interactive interface in which a user can map relationships between entities for generated entity packages.

Figure 3:
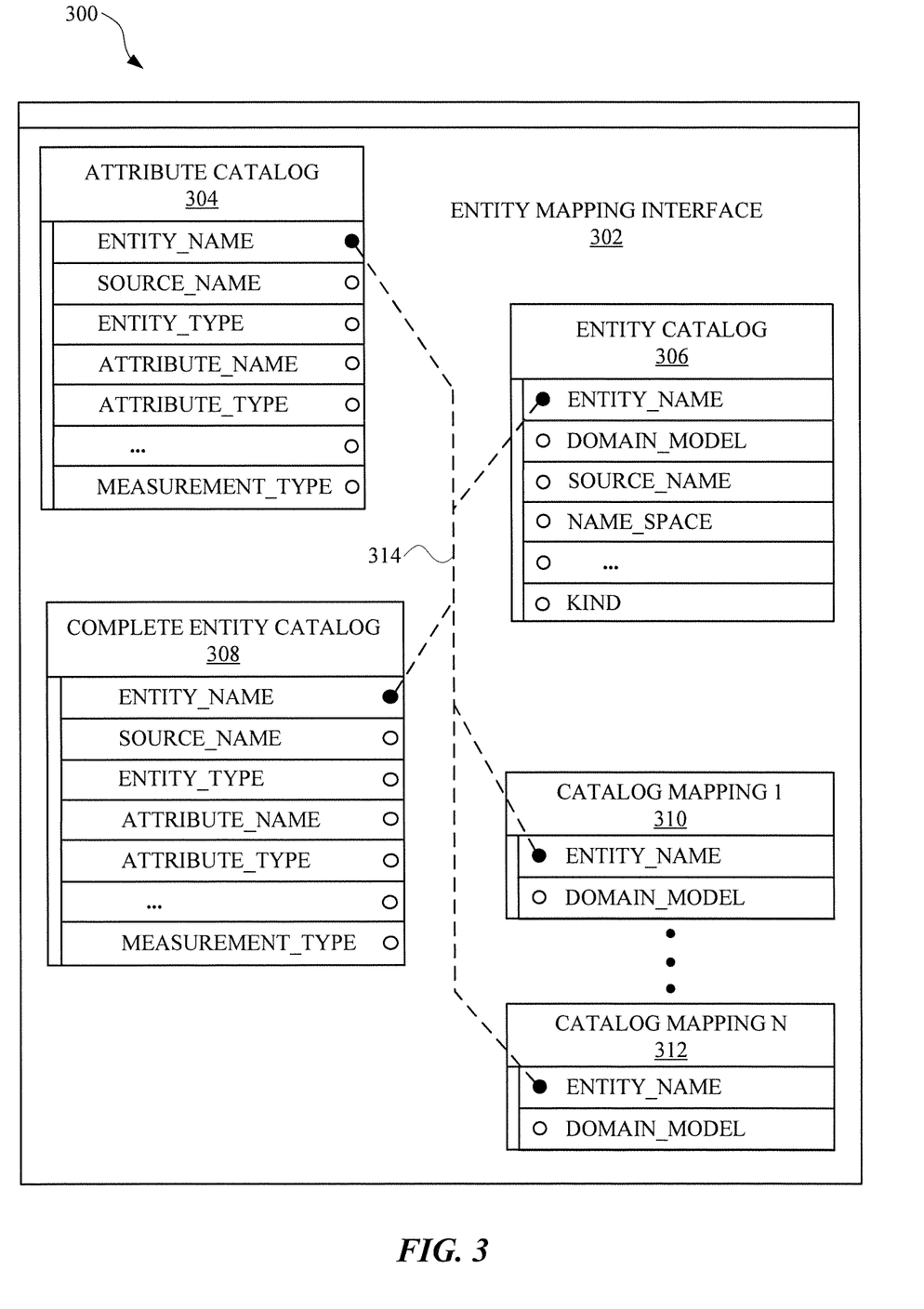
FIG. 3 illustrates an interface for linking entity data available to an entity mapping engine.

FIG. 3 illustrates an interface 300 for linking entity data available to an entity mapping engine. The entity mapping engine can be an application, software, and/or other script that executes on one or more processors of one or more computing devices. The interface 300 can be an entity mapping interface 302 for connecting sources of data in order to create complete entities that can be made available to end users and APIs. In some implementation, sources of data can be manually connected through the interface 300 by a user. For instance, connections 314 can be manually created by a user as a user selects various sources, entities, and/or attributes for connecting. In other implementations, the connections 314 can be generated by an entity mapping engine (e.g., entity mapping engine 106) that operates according to mapping rules (e.g., mapping rules 110), which provides standards for creating the connections 314 between entities. For instance, a mapping rule can include an exact match requirement that necessitates names of entities be identical before they can be connected and/or their attributes can be shared. An example of such an exact naming scheme is provided in FIG. 3, which includes a variety of sources associated with a common entity name (e.g., ENTITY_NAME). The sources can include an attribute catalog 304, an entity catalog 306, a complete entity catalog 308, and/or catalog mappings (i.e., catalog mapping 310 through catalog mapping N 312). Once the sources are mapped or otherwise connected, attribute data available at each of the sources can also be mapped by the entity mapping engine in order that complete entities can be generated based on the attribute data.

In some implementations, connections 314 between sources and/or entities can be provided according to a spatial radial match rule. According to the spatial radial match rule, entities associated with objects located within a physical radius can be connected. For instance, exploration and production apparatuses within a particular radius can be associated with entities such as data catalogs, complete entities, and/or any other sources of data. The entity mapping engine can filter the entities according to any physical coordinates that are mapped to or otherwise stored in associated with the entities. Thereafter, any entities that are associated with coordinates located within a predefined radius can be connected in order that their attributes can be shared. By sharing attributes, the entities can be completed and made available to users seeking to provide services or data based on the complete entities.

In other implementations, connections 314 between sources and/or entities can be provided according to one or more fuzzy matching processes. A fuzzy matching process can be, for example, a process that employs a Levenshtein distance analysis for determining similarities between entities and/or their particular attributes (e.g., ENTITY_NAME, SOURCE NAME, etc.). For instance, the Levenshtein distance between two entity names can be a minimum number of character edits that is required to render at least one entity name the same as another entity name. An example of two different entity names can include "WELL 001" and "WELL 1". A Levenshtein distance between "WELL 001" and "WELL 1" can be valued at "2," because only 2 characters (e.g., "00") need to be inserted into "WELL 1" in order to make the entity name equivalent to "WELL 001." Mapping rules that use Levenshtein distance or other fuzzy matching processes can employ thresholds that define a minimum distance between entity names before they can be matched or otherwise mapped. For example, a Levenshtein distance threshold "N," where "N" is any positive whole number, can be assigned to mapping rule in order that no entities are connected or mapped together unless their names correspond to a Levenshtein distance of at least "N."

Figure 4:
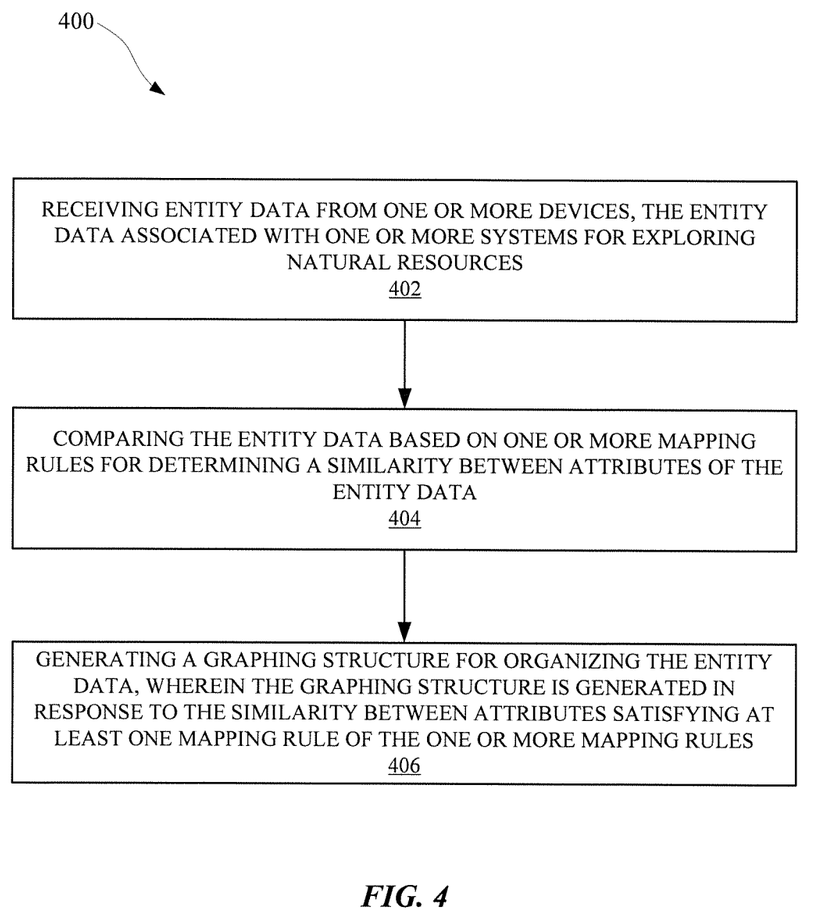
FIG. 4 illustrates a method for generating a graphing structure from exploration and/or production data.

FIG. 4 illustrates a method 400 for generating a graphing structure from exploration and/or production data. The method 400 can be performed by one or more computing devices, and/or any other apparatus capable of transmitting natural resource related data. As shown in FIG. 4, the method 400 can include a block 402 of receiving entity data from one or more devices, the entity data associated with one or more systems for exploring and/or producing natural resources. The method 400 can further include a block 404 of comparing the entity data based on one or more mapping rules for determining a similarity between attributes of the entity data. Additionally, the method 400 can include a block 406 of generating a graphing structure for organizing the entity data. The graphing structure can be generated in response to the similarity between attributes satisfying at least one mapping rule of the one or more mapping rules. Additionally, the graphing structure can include (i) at least one node that identifies a device that is connected to the one or more systems for exploring and/or producing natural resources and (ii) at least one node edge that identifies a property of the device identified by the at least one node.

Figure 5:
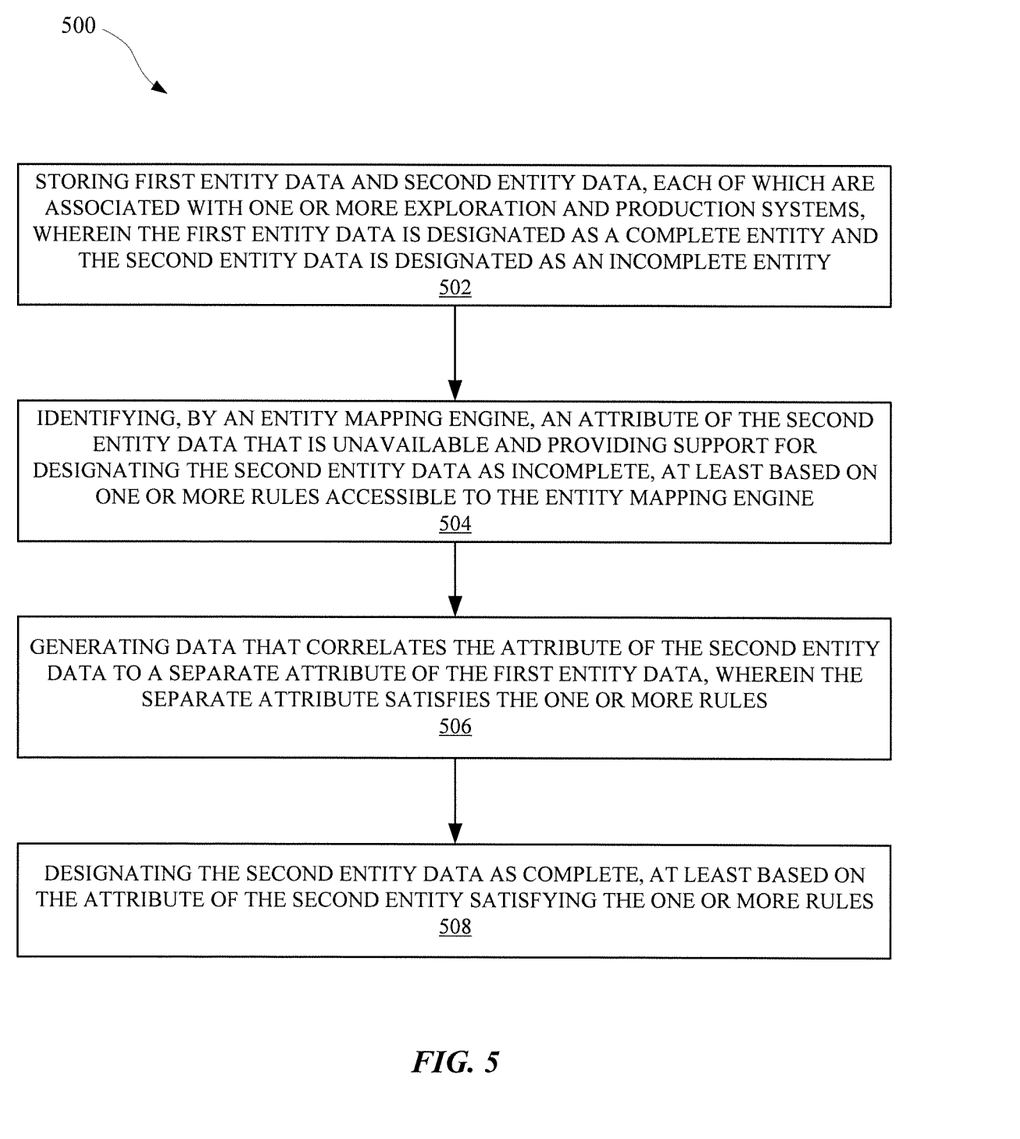
FIG. 5 illustrates a method for determining whether entity data of a graphical database is complete, according to some embodiments.

FIG. 5 illustrates a method 500 for determining whether entity data of a graphical database is complete, according to some embodiments. The method 500 can be performed by one or more computing devices, and/or any other apparatus capable of transmitting natural resource related data. The method 500 can include a block 502 of storing first entity data and second entity data. Each of the first entity data and the second entity data can be associated with one or more exploration and/or production systems. The first entity data can be designated as a complete entity and the second entity data can be designated as an incomplete entity. The method 500 can further include a block 504 of identifying, by an entity mapping engine, an attribute of the second entity data that is (i) unavailable and (ii) providing support for designating the second entity data as incomplete. The designation of the second entity data as incomplete can be at least partially based on one or more rules accessible to the entity mapping engine. The method 500 can also include a block 506 of generating data that correlates the attribute of the second entity data to a separate attribute of the first entity data. The separate attribute can satisfy or otherwise fulfill the one or more rules. Additionally, the method 500 can include a block 508 of designating the second entity data as complete, at least based on the attribute of the second entity satisfying the one or more rules.

Figure 6:
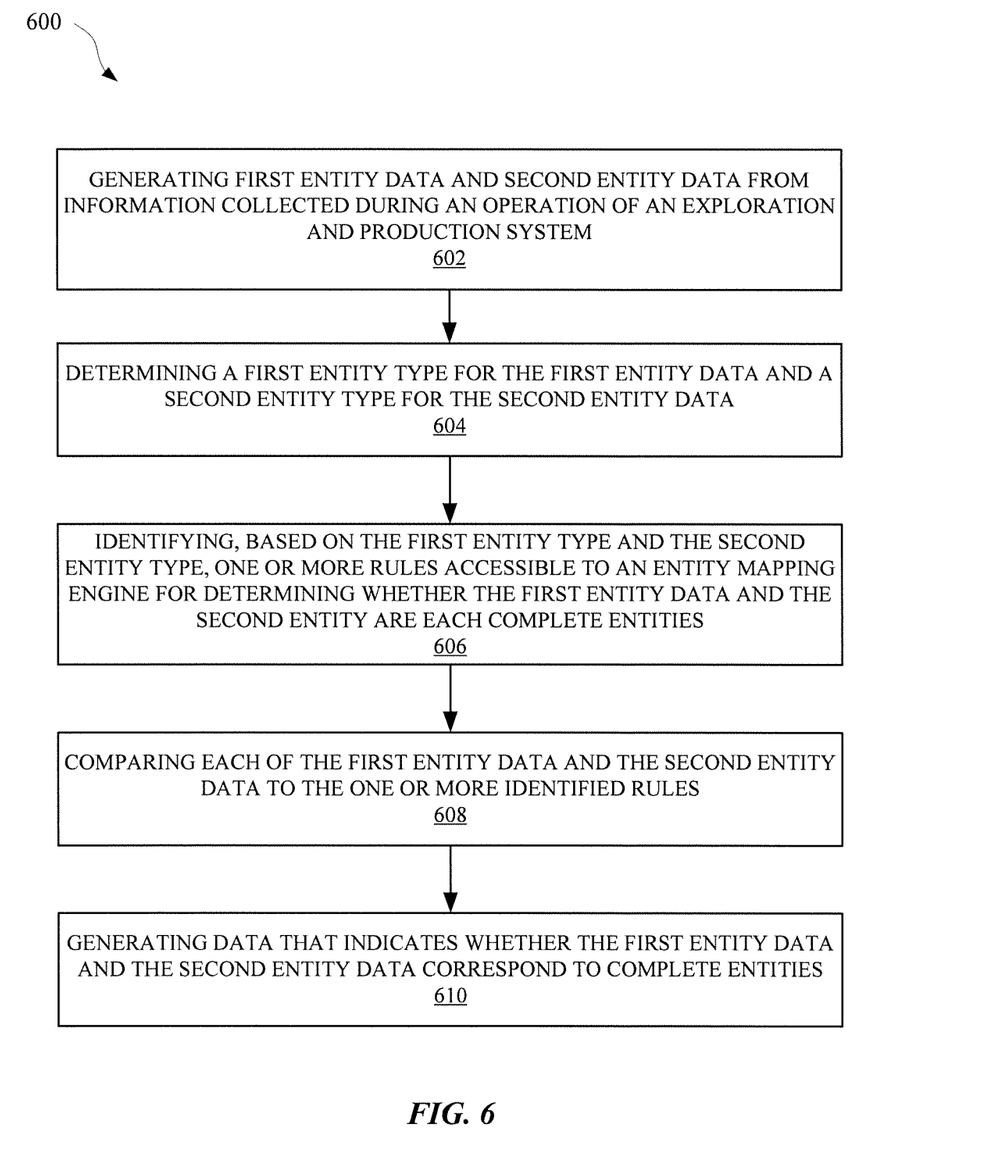
FIG. 6 illustrates a method for classifying entity data as a complete entity data according to one or more mapping rules that are based on one or more different entity types.

FIG. 6 illustrates a method 600 for classifying entity data as a complete entity according to one or more mapping rules that are based on one or more different entity types. The method 600 can be performed by one or more computing devices, and/or any other apparatus capable of transmitting natural resource related data. The method 600 can include a block 602 of generating first entity data and second entity data from information collected during an operation of an exploration and/or production system. The method 600 can also include a block 604 of determining a first entity type for the first entity data and a second entity type for the second entity data. For instance, the first entity type can be an oil well and the second entity type can be a drill bit. The method 600 can further include a block 606 of identifying, based on the first entity type and the second entity type, one or more rules accessible to an entity mapping engine for classifying the first entity data and the second entity each as complete entities. The method 600 can also include a block 608 of comparing each of the first entity data and the second entity data to the one or more identified rules, and block 610 can, include generating data that indicates whether the first entity data and the second entity data correspond to complete entities.

Figure 7:
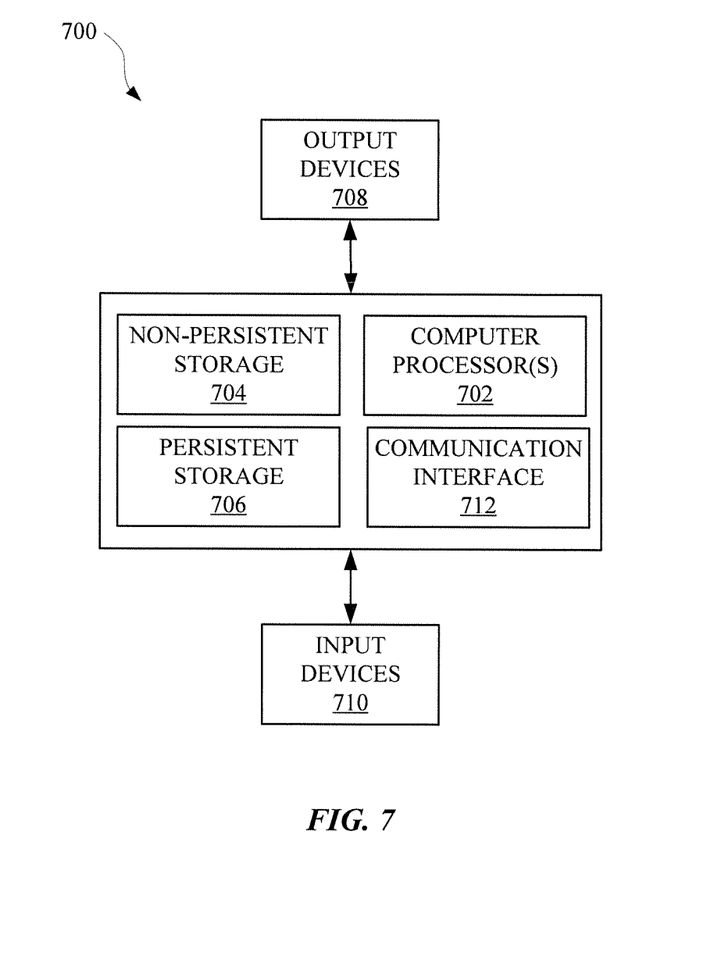
FIG. 7 illustrates a computer system that can operate according to any of the implementations discussed herein.

Embodiments may be implemented on a computing system. Any combination of mobile, desktop, server, router, switch, embedded device, or other types of hardware may be used. For example, as shown in FIG. 7, the computing system 700 may include one or more computer processors 702, non-persistent storage 704 (e.g., volatile memory, such as random access memory (RAM), cache memory), persistent storage 706 (e.g., a hard disk, an optical drive such as a compact disk (CD) drive or digital versatile disk (DVD) drive, a flash memory, etc.), a communication interface 712 (e.g., Bluetooth interface, infrared interface, network interface, optical interface, etc.), and numerous other elements and functionalities.

The computer processor(s) 702 may be an integrated circuit for processing instructions. For example, the computer processor(s) may be one or more cores or micro-cores of a processor. The computing system 700 may also include one or more input devices 710, such as a touchscreen, keyboard, mouse, microphone, touchpad, electronic pen, or any other type of input device.

The communication interface 712 may include an integrated circuit for connecting the computing system 700 to a network (not shown) (e.g., a local area network (LAN), a wide area network (WAN) such as the Internet, mobile network, or any other type of network) and/or to another device, such as another computing device.

Further, the computing system 700 may include one or more output devices 708, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 702, non-persistent storage 704, and persistent storage 706. Many different types of computing systems exist, and the aforementioned input and output device(s) may take other forms.

Software instructions in the faun of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 8:
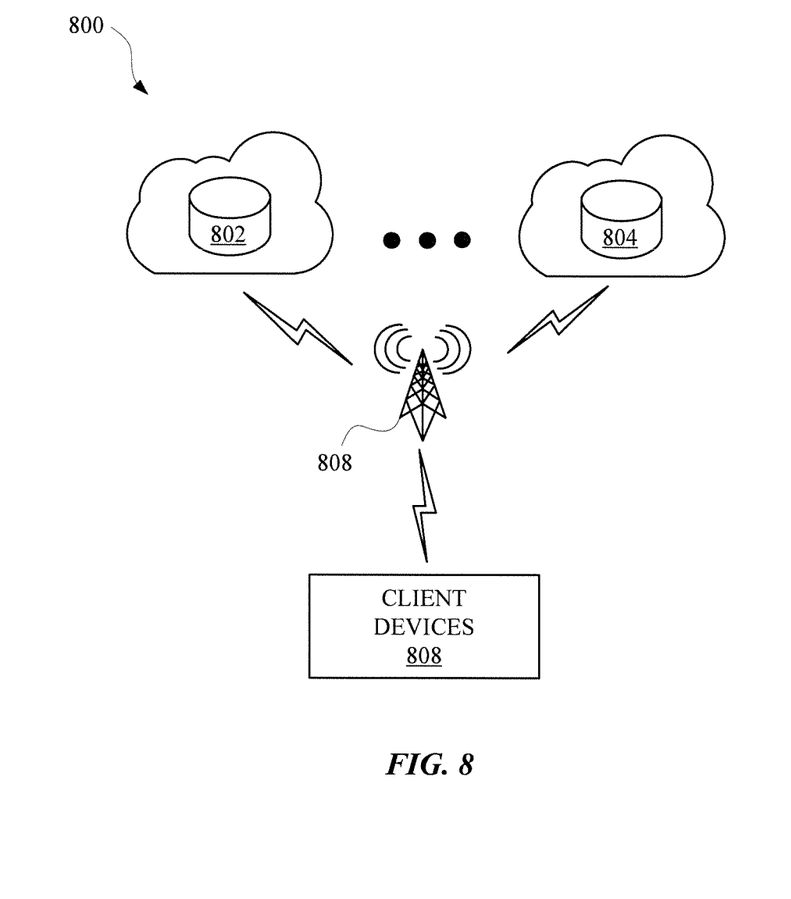
FIG. 8 illustrates a network that can include the computer system of FIG. 7 and/or operate according to any of the embodiments discussed herein.

The computing system 700 in FIG. 7 may be connected to or be a part of a network, such as the network 806 described by system 800 of FIG. 8. For example, as shown in FIG. 8, the network 806 may include multiple nodes (e.g., node X 802, node Y 804). Each node may correspond to a computing system, such as the computing system shown in FIG. 7, or a group of nodes combined may correspond to the computing system shown in FIG. 7. By way of an example, embodiments may be implemented on a node of a distributed system that is connected to other nodes. By way of another example, embodiments may be implemented on a distributed computing system having multiple nodes, where each portion of the embodiment may be located on a different node within the distributed computing system. Further, one or more elements of the aforementioned computing system 700 may be located at a remote location and connected to the other elements over a network.

Although not shown in FIG. 8, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 802, node Y 804) in the network 806 may be configured to provide services for a client device 808. For example, the nodes may be part of a cloud computing system. The nodes may include functionality to receive requests from the client device 708 and transmit responses to the client device 808. The client device 808 may be a computing system, such as the computing system shown in FIG. 7. Further, the client device 808 may include and/or perform all or a portion of one or more embodiments.

The computing system or group of computing systems described in FIGS. 7 and 8 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions present only a few examples of functions performed by the computing system of FIG. 7 and the nodes and/or client device in FIG. 8. Other functions may be performed using one or more embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method of providing a completed data set, the method comprising:
   receiving a request for a completed data set describing a first entity, wherein the completed data set is associated with a final completeness score above a threshold value;
   receiving a first entity data describing a first entity, wherein the first entity data is determined to be incomplete, wherein incomplete comprises the first entity data being associated with a first completeness score below the threshold value;
   generating a graph database by:
     receiving entity data from one or more devices comprising an oil rig or an oil well, the entity data of a plurality of entities including the first entity data, the plurality of entities associated with one or more systems for exploring or producing natural resources, wherein the entity data comprises a first set of attributes of a first entity and a second set of attributes of a second entity;
     selecting a first mapping rule corresponding to an entity type of the first entity and a second mapping rule corresponding to a second entity type of the second entity;
     applying the first mapping rule to the first set of attributes and the second mapping rule to the second set of attributes to determine that the first set of attributes are complete and the second set of attributes are incomplete;
   comparing the entity data based on a matching rule for determining a similarity between the first set of attributes and the second set of attributes;
   completing the second set of attributes using the first set of attributes based on the similarity satisfying a threshold; and
   generating a graphing structure for organizing the entity data of the second entity, wherein the graphing structure comprises (i) a plurality of nodes for the second entity, the plurality of nodes comprising at least one node that identifies a device that is connected to the one or more systems for exploring or producing natural resources and (ii) a plurality of edges, the plurality of edges representing a respective property of a relationship between the plurality of nodes; and
   completing, using relationships among the entity data in the graph database, the first entity data to generate the completed data set having a final completeness score above the threshold value.

2. The method of claim 1, wherein comparing the entity data based on the matching rule comprising:
   determining a Levenshtein distance between a name of the first entity and a name of the second entity; and
   determining that the Levenshtein distance satisfies a threshold.

3. The method of claim 1, further comprising:
   processing, on the entity data, a device mapping rule that identifies a target set of attributes to be mapped or defined to satisfy the device mapping rule.

4. The method of claim 3, further comprising:
   when the second set of attributes lacks an attribute identified in the target set of attributes, assigning a completeness score to the entity data.

5. The method of claim 4, further comprising:
   when the second set of attributes includes all attributes identified in the target set of attributes, designating the entity data as a complete entity.

6. The method of claim 1, where the graphing structure includes a first node that identifies the device, a second node that identifies a product of the device, and multiple node edges that are each connected between the first node and the second node in different directions.

7. The method of claim 6, wherein the device is an oil rig, the product is a reservoir, and at least one edge of the multiple node edges indicates that the oil rig functioned to produce the reservoir.

8. A system, comprising:
   one or more processors; and
   memory configured to store instructions that, when executed by one or more processors, cause the one or more processors to perform operations that include:

receiving a request for a completed data set describing a first entity, wherein the completed data set is associated with a final completeness score above a threshold value;

receiving a first entity data describing a first entity, wherein the first entity data is determined to be incomplete, wherein incomplete comprises the first entity data being associated with a first completeness score below the threshold value;

generating a graph database by:

receiving entity data from one or more devices, the entity data of a plurality of entities including the first entity, the plurality of entities associated with one or more systems for exploring or producing natural resources, wherein the one or more systems comprise an oil rig or an oil well, and wherein the entity data comprises a first set of attributes of a first entity and a second set of attributes of a second entity;

selecting a first mapping rule corresponding to an entity type of the first entity and a second mapping rule corresponding to a second entity type of the second entity;

applying the first mapping rule to the first set of attributes and the second mapping rule to the second set of attributes to determine that the first set of attributes are complete and the second set of attributes are incomplete;

comparing the entity data based on a matching rule for determining a similarity between the first set of attributes and the second set of attributes;

completing the second set of attributes using the first set of attributes based on the similarity satisfying a threshold; and generating a graphing structure for organizing second entity data comprising the entity data of the second entity, wherein the graphing structure comprises (i) a plurality of nodes for the second entity, the plurality of nodes comprising at least one node that identifies a device that is connected to the one or more systems for exploring or producing natural resources and (ii) a plurality of edges, the plurality of edges representing a respective property of a relationship between the plurality of nodes; and completing, using relationships among the entity data in the graph database, the first entity data to generate the completed data set having a final completeness score above the threshold value.

9. The system of claim 8, wherein completing further comprises using a node edge in the graph database to identify a related node, other than a first node associated with the first entity, that contains additional data useable to complete the first entity data.

10. The system of claim 9, wherein the node edge is associated with property data that describes a temporal relationship between the first entity data and the second entity data.

11. The system of claim 8, wherein the first entity data and the second entity data include identifiers for the oil rig and oil well.

12. The system of claim 8, wherein designating the second entity data as complete includes modifying a completeness score for the second entity data.

13. The system of claim 8, wherein the first entity data and the second entity data are stored on different devices.

14. A non-transitory computer readable medium configured to store instructions that, when executed by one or more processors, cause one or more processors to perform operations that include:

receiving a request for a completed data set describing a first entity, wherein the completed data set is associated with a final completeness score above a threshold value;

receiving a first entity data describing a first entity, wherein the first entity data is determined to be incomplete, wherein incomplete comprises the first entity data being associated with a first completeness score below the threshold value;

generating a graph database by:

receiving entity data from one or more devices comprising an oil rig or an oil well, the entity data of a plurality of entities including the first entity, the plurality of entities associated with one or more systems for exploring or producing natural resources, wherein the entity data comprises a first set of attributes of a first entity and a second set of attributes of a second entity;

selecting a first mapping rule corresponding to an entity type of the first entity and a second mapping rule corresponding to a second entity type of the second entity;

applying the first mapping rule to the first set of attributes and the second mapping rule to the second set of attributes to determine that the first set of attributes are complete and the second set of attributes are incomplete;

comparing the entity data based on a matching rule for determining a similarity between the first set of attributes and the second set of attributes;

completing the second set of attributes using the first set of attributes based on the similarity satisfying a threshold; and generating a graphing structure for organizing second entity data of the entity data of the second entity, wherein the graphing structure comprises (i) a plurality of nodes for the second entity, the plurality of nodes comprising at least one node that identifies a device that is connected to the one or more systems for exploring or producing natural resources and (ii) a plurality of edges, the plurality of edges representing a respective property of a relationship between the plurality of nodes; and completing, using relationships among the entity data in the graph database, the first entity data to generate the completed data set having a final completeness score above the threshold value.

15. The non-transitory computer readable medium of claim 14, wherein the matching rule include a name matching rule for determining a similarity between entity names.

16. The non-transitory computer readable medium of claim 14, wherein comparing the entity data includes identifying attributes available from the first entity data and the second entity data.

17. The non-transitory computer readable medium of claim 14, wherein at least one rule identifies a number of attributes to be available for indicating whether the first entity data corresponds to a complete entity.

18. The non-transitory computer readable medium of claim 17, wherein the first entity data is stored by a graphing database that includes nodes and node edges that identify different portions of the one or more systems.

19. The non-transitory computer readable medium of claim 18, wherein a node of the first entity data identifies a reservoir, the oil rig, or the oil well.

\* \* \* \* \*